United States Patent
Mori et al.

(10) Patent No.: US 9,010,906 B2
(45) Date of Patent: Apr. 21, 2015

(54) PRINTER AND NON-TRANSITORY COMPUTER-READABLE STORAGE MEDIUM STORING PRINTER CONTROL PROGRAM

(71) Applicants: Shumei Mori, Ichinomiya (JP); Yohei Kuno, Nagoya (JP)

(72) Inventors: Shumei Mori, Ichinomiya (JP); Yohei Kuno, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 14/033,861

(22) Filed: Sep. 23, 2013

(65) Prior Publication Data

US 2014/0085367 A1    Mar. 27, 2014

(30) Foreign Application Priority Data

Sep. 27, 2012  (JP) .................................. 2012-214915

(51) Int. Cl.
*B41J 2/05* (2006.01)
*B41J 2/045* (2006.01)
*G06K 15/10* (2006.01)

(52) U.S. Cl.
CPC ........... *B41J 2/04541* (2013.01); *G06K 15/102* (2013.01)

(58) Field of Classification Search
USPC ........................................ 347/5, 9, 12, 19, 49
See application file for complete search history.

(56) References Cited

U.S. PATENT DOCUMENTS

| | | | | |
|---|---|---|---|---|
| 5,363,134 | A | * | 11/1994 | Barbehenn et al. ............. 347/49 |
| 5,757,394 | A | * | 5/1998 | Gibson et al. ................... 347/19 |
| 6,568,783 | B2 | * | 5/2003 | Hu et al. .......................... 347/19 |
| 8,360,544 | B2 | | 1/2013 | Kayahara |
| 8,439,473 | B2 | | 5/2013 | Iriguchi et al. |
| 8,517,494 | B2 | | 8/2013 | Kakutani |
| 8,526,721 | B2 | | 9/2013 | Yun et al. |
| 2009/0289990 | A1 | | 11/2009 | Kayanaka |

FOREIGN PATENT DOCUMENTS

JP    2009-279888 A    12/2009

* cited by examiner

*Primary Examiner* — Lam Nguyen
(74) *Attorney, Agent, or Firm* — Fox Rothschild LLP

(57) ABSTRACT

A printer includes discharge control devices, a first ID storage device, a control data output device, a connection device, a connection control device, an assigning device, a processor, and a memory. The processor performs outputting print data, which is data to discharge the liquid by the discharge port group connected to the discharge control device, corresponding to the unique ID from the control data output device, by using a communication ID that corresponds to the unique ID, via a connection device controlled by a connection control device, to each of a plurality of discharge control devices, and controlling discharge of the liquid by the discharge port groups to which the plurality of discharge control devices are respectively connected, in accordance with the print data which corresponds to the unique ID of the individual discharge control device and which has been output from the control data output device.

7 Claims, 9 Drawing Sheets

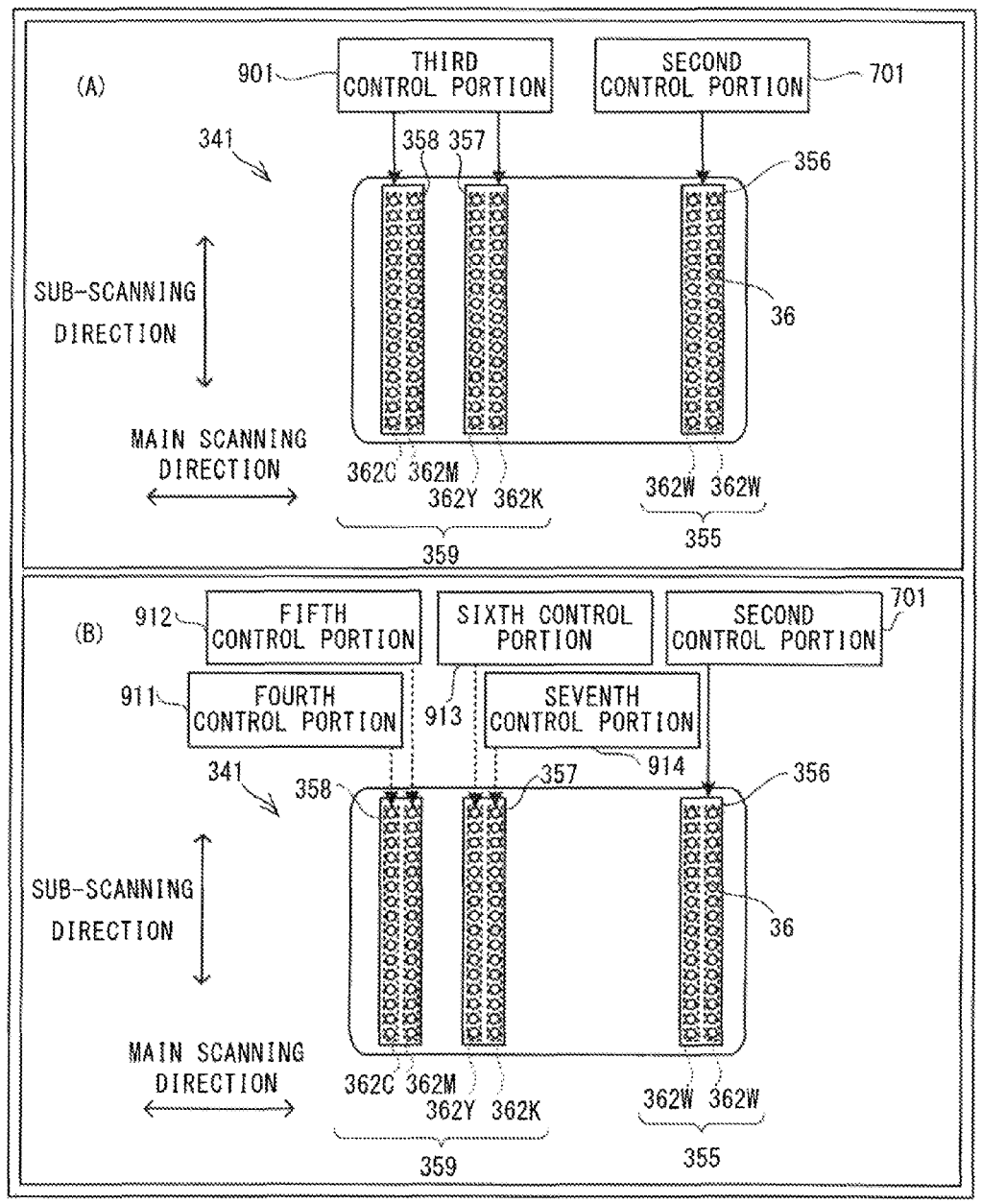

PRINTER AND NON-TRANSITORY COMPUTER-READABLE STORAGE MEDIUM STORING PRINTER CONTROL PROGRAM

CROSS-REFERENCE TO RELATED APPLICATION

This application claims priority to Japanese Patent Application No. 2012-214915, filed Sep. 27, 2012, the content of which is hereby incorporated herein by reference in its entirety.

BACKGROUND

The present disclosure relates to a printer that performs printing based on print data, and to a non-transitory computer-readable storage medium storing a printer control program.

A printer is known that performs printing based on print data while relatively moving a carriage, on which is mounted a print head that discharges ink, with respect to a fabric held on a platen. In this type of printer, white ink and color ink are used. Generally, the base is printed using the white ink by the printer after a pretreatment liquid is applied onto the fabric by the user before printing, and printing is performed on the base using the color ink.

In the above-described printer, a processor that controls print processing is connected, via a bus, with a plurality of structural members that include a first print portion control circuit (a first discharge control portion) and a second print portion control circuit (a second discharge control portion) by parallel connection. In contrast to this, for example, it is proposed that the first discharge control portion and the second discharge control portion are connected with the processor via a connection device that forms a serial connection, such as a USB hub or the like, and the processor that controls the print processing outputs print data to the first discharge control portion and to the second discharge control portion, respectively. In this type of case, when a power source of the printer is turned on, a USB host controller detects devices that are connected to the USB hub and automatically assigns an address to each of the connected devices and performs notification. The address is an ID that identifies each device and is used in transmitting data between the processor and the devices.

SUMMARY

However, when a first discharge control portion and a second discharge control portion of a printer are respectively connected to a USB hub, as disclosed in Patent Literature 1, for example, an address is automatically assigned to each of the discharge control portions according to an order in which they are detected by a USB host controller. For example, when the first discharge control portion performs control of a discharge port group that discharges white ink and the second discharge control portion performs control of a discharge port group that discharges color ink, a processor prepares print data that is output to each of the discharge control portions. Specifically, the processor sets print data and addresses in association with each other such that print data relating to the discharge of white ink is output to the address of the first discharge control portion and print data relating to the discharge of color ink is output to the address of the second discharge control portion. However, if the address is automatically assigned in the order of detection by the USB host controller, depending on the order in which each of the discharge control portions has been detected, an associative relationship between the address and the discharge control portion is not necessarily always the same. Thus, in this type of printer, for example, it is possible that the print data relating to the discharge of white ink may be output to the second discharge control portion that should properly perform control to discharge color ink. In this type of case, each of the discharge control portions performs processing to discharge ink based on print data that is different to the data that should properly be received, and there is a possibility that print quality may deteriorate.

The present disclosure provides a printer that is capable of inhibiting a deterioration in print quality caused by erroneous transmission of print data when print data is output via a connection device, and a non-transitory computer-readable storage medium storing a printer control program.

Various embodiments provide a printer including a plurality of discharge control devices, a first ID storage device, a control data output device, a connection device, a connection control device, an assigning device, a processor, and a memory. The plurality of discharge control devices are configured to be connected to at least one of a plurality of discharge port groups having a plurality of discharge ports capable of discharging liquid, and to control discharge of the liquid by the connected discharge port group. The first ID storage device is configured to store a unique ID that is set in advance for each of the discharge control devices. The control data output device is configured to output print data to each of the discharge control devices. The print data is data to discharge the liquid by the discharge port group connected to the discharge control device. The connection device includes a first connection port capable of connecting to the control data output device and the plurality of second connection ports that are capable of respectively connecting to the plurality of discharge control devices and that are capable of connecting to the first connection port such that data transmission is possible. The connection control device is configured to control data transmission between the first connection port and the plurality of second connection ports. The assigning device is configured to assign a communication ID to each of the plurality of discharge control devices that are connected to the plurality of second connection ports and used in processing that transmits data via the connection device between the control data output device and the discharge control device depending on an order in which each of the discharge control devices is detected. The memory is configured to store computer-readable instructions. The computer-readable instructions cause the processor to perform processes including outputting print data corresponding to the unique ID from the control data output device, by using a communication ID that corresponds to the unique ID, via a connection device controlled by a connection control device, to each of a plurality of discharge control devices, and controlling discharge of the liquid by the discharge port groups to which the plurality of discharge control devices are respectively connected, in accordance with the print data which corresponds to the unique ID of the individual discharge control device and which has been output from the control data output device.

Various embodiments also provide a non-transitory computer-readable medium storing computer readable instructions that, when executed, cause a printer to perform processes including outputting print data corresponding to a unique ID from a control data output device, via a connection device controlled by a connection control device, to each of a plurality of discharge control devices by using a communication ID that corresponds to a unique ID, the control data output device outputting the print data to each of the discharge control devices, the plurality of discharge control devices being connected to at least one of a plurality of discharge port groups having a plurality of discharge ports capable of discharging liquid, and controlling discharge of the liquid by the connected discharge port group, the unique ID being an ID that is set in advance for each of the discharge control devices and that is stored in a first ID storage device, the print data being data to discharge the liquid by the discharge port group connected to the discharge control device, the communication ID being an ID that is assigned by an assigning device to each of the plurality of discharge control devices that are connected to a plurality of second connection ports and being used in processing that transmits data via the connection device between the control data output device and the discharge control device depending on an order in which each of the discharge control devices is detected, the connection device including a first connection port capable of connecting to the control data output device and the plurality of second connection ports that are capable of respectively connecting to the plurality of discharge control devices and that are capable of connecting to the first connection port such that data transmission is possible, the connection control device controlling data transmission between the first connection port and the plurality of second connection ports, and controlling discharge of the liquid by the discharge port groups to which the plurality of discharge control devices are respectively connected, in accordance with the print data which corresponds to the unique ID of the individual discharge control device and which has been output from the control data output device.

BRIEF DESCRIPTION OF THE DRAWINGS

Embodiments of the disclosure will be described below in detail with reference to the accompanying drawings in which:

FIG. 9 is an explanatory diagram of a schematic configuration of a carriage 341 of a modified example.

DETAILED DESCRIPTION

Figure 1:
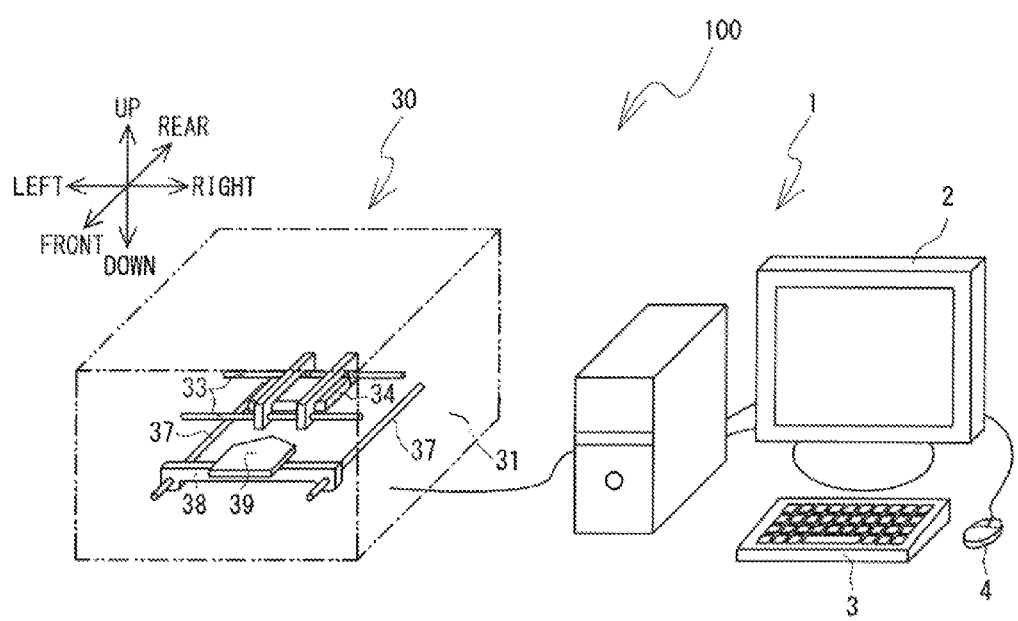
FIG. 1 is a perspective view showing a schematic configuration of a printing system 100.

Hereinafter, an embodiment of the present disclosure will be explained with reference to the drawings. Note that the drawings are used to explain technological features that can be adopted by the present disclosure, and are not intended to limit the content. First, a printing system 100, which includes a printer 30 and a personal computer (hereinafter referred to as a PC) 1 that is connected to the printer 30, will be explained with reference to FIG. 1. The printer 30 and the PC 1 are mutually connected via a cable. The printer 30 is a known inkjet printer for fabrics, and can perform printing on the fabric, which is a print medium, using print heads 35 (refer to FIG. 2). The PC 1 is a multipurpose information processing device. A monitor 2, which is a display device, and a keyboard 3 and a mouse 4, which are input devices, are connected to the PC 1. The PC 1 can generate print data, which will be described later, and can transmit the generated print data to the printer 30 via the cable. Based on the print data transmitted from the PC 1, the printer 30 can perform print processing that causes discharge port groups 361 provided on the bottom of each of the print heads 35 to discharge liquid (ink, for example).

The printer 30 will be explained with reference to FIG. 1, FIG. 2 and FIG. 3. Note that the lower left side and the upper right side of FIG. 1 respectively correspond to the front side and the back side of the printer 30. The left-right direction and the up-down direction of FIG. 1 respectively correspond to the left-right direction and the up-down direction of the printer 30.

First, a physical configuration of the printer 30 will be explained with reference to FIG. 1 and FIG. 2. As shown in FIG. 1, the printer 30 includes a housing 31 having a rectangular box shape. A pair of guide rails 37 extend in the front-rear direction in a lower portion inside the housing 31, at substantially the center in the left-right direction of the housing 31. A platen support 38 is supported by the guide rails 37 such that the platen support 38 can move in the front-rear direction (a sub-scanning direction) along the guide rails 37. A replaceable platen 39 is fixed to substantially the center, in the left-right direction, of a top surface of the platen support 38. The platen 39 is a plate member having a substantially pentagonal shape in a plan view. For example, a fabric, such as a t-shirt, can be placed on a top surface of the platen 39. Although not shown in detail in the drawings, the platen support 38, to which the platen 39 is fixed, is moved in the sub-scanning direction by a sub-scanning mechanism that includes a sub-scanning motor 56 (refer to FIG. 3) and a belt.

A pair of guide rails 33 extend in the left-right direction above the platen 39, substantially in the center of the housing 31 in the front-rear direction. A carriage 34 is supported by the guide rails 33 such that the carriage 34 can move in the left-right direction (a main scanning direction) along the guide rails 33. The plurality of print heads 35 (refer to FIG. 2) are mounted on the carriage 34. The arrangement of the plurality of print heads 35 will be described later with reference to FIG. 2. Although not shown in detail in the drawings, the carriage 34 provided with the plurality of print heads 35 is moved in the main scanning direction by a main scanning mechanism that includes a main scanning motor 83 (refer to FIG. 3) and a belt.

The configuration of the carriage 34 will be explained with reference to FIG. 2. Four print heads 35W and print heads 35C, 35M, 35Y and 35K are mounted on the carriage 34 of the present embodiment. In the description below, each of the four print heads 35W and each of the print heads 35C, 35M, 35Y and 35K will also be referred to as the print heads 35. A plurality of discharge ports 36 are provided on a bottom surface of each of the print heads 35. In the present embodiment, 128 of the discharge ports 36 are provided on each of the print heads 35. FIG. 2 shows a smaller number of the discharge ports 36 than the actual number, in order to simplify the drawing. Each of the discharge ports 36 can discharge liquid. Although not shown in detail in the drawings, ink that is supplied to the print head 35 from an ink cartridge mounted on the printer 30 is discharged downward from each of the discharge ports 36 by driving a piezoelectric element that is provided on each discharge channel. Note that the ink supplied to the print head 35 may be discharged downward from the discharge ports 36 by driving a heating element or the like that is provided on each discharge channel.

The plurality of discharge ports 36 are grouped into a first unit 351 and a second unit 352. The first unit 351 includes four discharge port groups 361W that discharge a white ink for pretreatment. The four discharge port groups 361W are respectively provided on bottom surfaces of the four print heads 35W. In other words, in the present embodiment, the plurality of discharge ports 36 that are provided on the bottom surface of the individual print head 35 form one discharge port group 361. The four discharge port groups 361W (the four print heads 35W) are arranged side by side in the main scanning direction.

The second unit 352 is arranged in a position separated from the first unit 351 in the sub-scanning direction. The second unit 352 is provided with four discharge port groups 361C, 361M, 361Y and 361K that each discharge color ink for post-treatment after the discharge of the white ink for pretreatment. The four discharge port groups 361C, 361M, 361Y and 361K are respectively provided on bottom surfaces of the print heads 35C, 35M, 35Y and 35K. The four discharge port groups 361C, 361M, 361Y and 361K are arranged side by side in the main scanning direction. The discharge port group 361C discharges cyan ink. The discharge port group 361M discharges magenta ink. The discharge port group 361Y discharges yellow ink. The discharge port group 361K discharges black ink.

The white ink for pretreatment is an ink that is discharged onto a predetermined printing area before discharging the color ink. The color ink for post-treatment is an ink that is discharged onto the same predetermined printing area after the white ink for pretreatment has been discharged. In the present embodiment, the four discharge port groups 361W that discharge the white ink for pretreatment and the discharge port groups 361C, 361M, 361Y and 361K that each discharge the color ink for post-treatment are arranged separated from each other in the sub-scanning direction. For example, in the print processing that will be described later with reference to FIG. 4, the printer 30 repeats printing of one line by moving the platen 39 in the sub-scanning direction (the front-rear direction) after printing of one line in the main scanning direction (the left-right direction). In this type of print processing, the printer 30 simultaneously discharges, onto a predetermined area, the respective color inks from the four discharge port groups 361W of the first unit 351 for pretreatment and from the discharge port groups 361C, 361M, 361Y and 361K of the second unit 352 for post-treatment. The predetermined area is an area onto which the pretreatment ink has already been discharged and onto which the post-treatment ink is to be discharged. Note that the printing of one line corresponds to printing of an image that is printed by one cycle of scanning (one-pass scanning).

In the description below, the four discharge port groups 361W and the discharge port groups 361C, 361M, 361Y and 361K are also each referred to as the discharge port group 361. Further, at least one of the discharge port groups 361 having the plurality of discharge ports 36, such as the first unit 351 or the second unit 352, is also referred to as a discharge unit. In the present embodiment, each of the plurality of discharge ports 36 that are included in the same discharge port group 361 discharges ink supplied from the same ink cartridge.

Figure 2:
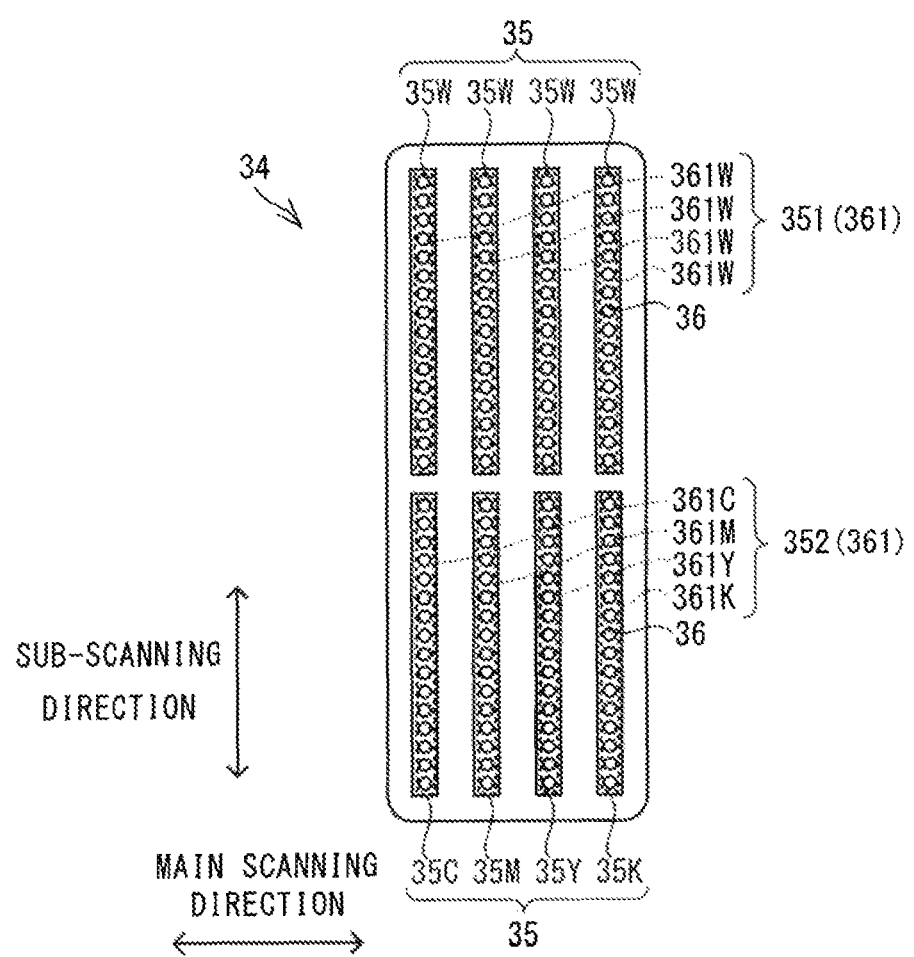
FIG. 2 is a bottom plan view showing a schematic configuration of a carriage 34.
Figure 3:
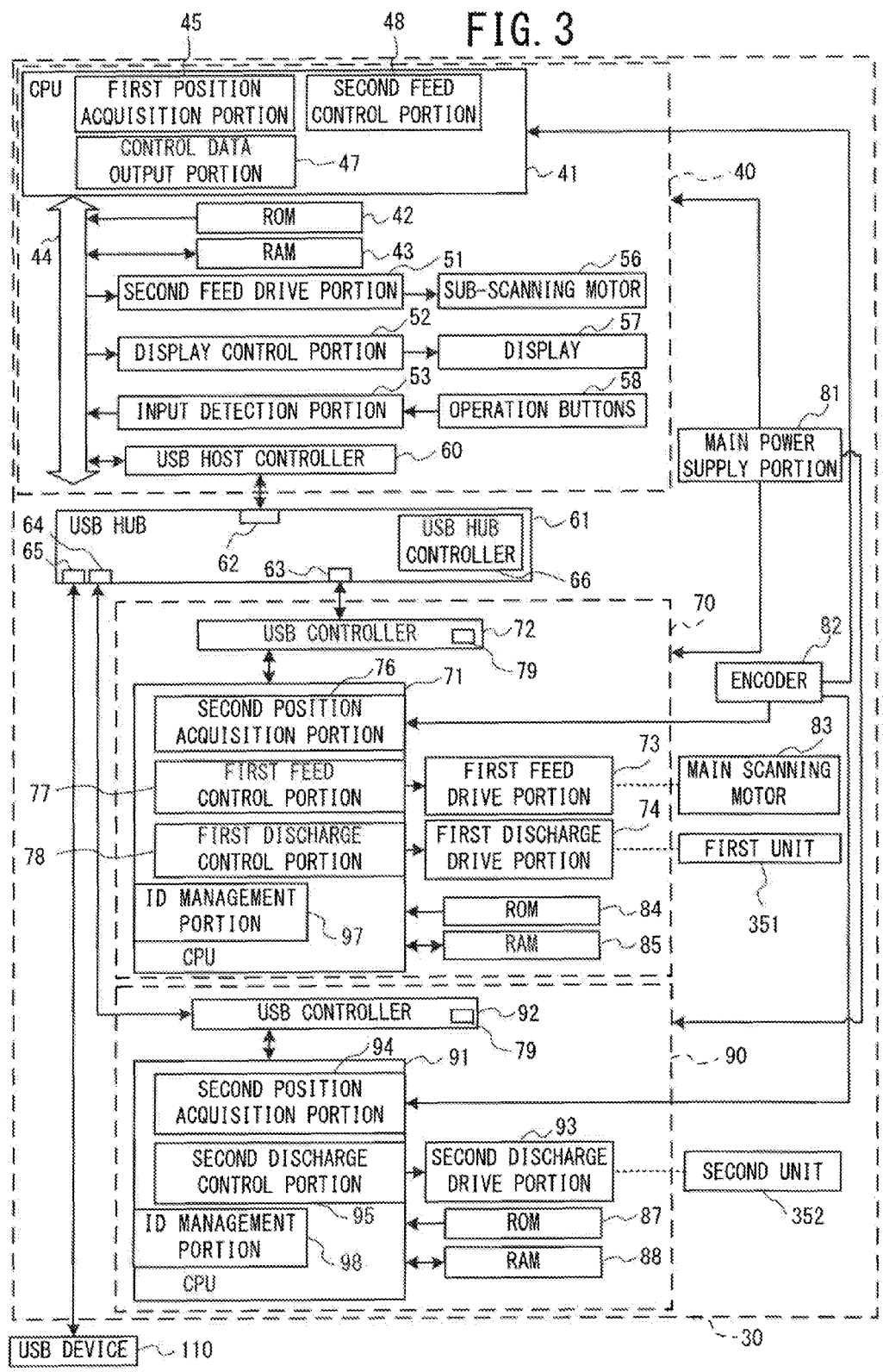
FIG. 3 is a block diagram showing an electrical configuration of a printer 30.

Note that it is sufficient that the printer 30 of the present embodiment is provided with at least two of the discharge port groups 361, and the type and the number of the discharge port groups 361 are not limited to the example shown in FIG. 2. For example, the number of the discharge port groups 361 corresponding to the white ink need not necessarily be limited to four, and may be only one. When a plurality of the discharge port groups 361 are mounted on the carriage 34 corresponding to the white ink, printing may be performed using some of the discharge port groups 361. Further, with respect to the color inks, three of the discharge port groups 361 that correspond to three colors (cyan, magenta, yellow) other than black may be provided, or one of the discharge port groups 361 that corresponds to one of the four colors (cyan, magenta, yellow and black) may be provided. The discharge port group 361 that can discharge an ink (for example, gold, silver or the like) that is other than cyan, magenta, yellow and black may be provided.

Further, with respect to the pretreatment ink and the post-treatment ink, depending on a printing image, the color ink for post-treatment need not necessarily be discharged after the white ink for pretreatment has been discharged. More specifically, there may be an area onto which only the white ink for pretreatment is discharged or an area onto which only the color ink for post-treatment is discharged. Further, in the present embodiment, the white ink is used as the pretreatment liquid, and the color inks are used as the post-treatment liquid. However, the combination of the pretreatment liquid and the post-treatment liquid, and the liquid type etc. can be changed as appropriate, and are not limited to the case of the present embodiment. For example, a treating agent to improve fixation of the ink may be used as the pretreatment liquid, and a color ink may be used as the post-treatment liquid. For example, in discharge printing, a discharging agent may be used as the pretreatment liquid and an ink for discharge printing may be used as the post-treatment liquid. In another example, the pretreatment liquid and the post-treatment liquid may be the same type of liquid.

An electrical configuration of the printer 30 will be explained with reference to FIG. 3. The printer 30 is configured such that a first control portion 40, a second control portion 70 and a third control portion 90 are connected via a USB hub 61. The first control portion 40 is provided with a CPU 41 that performs overall control of the printer 30. The CPU 41 is a first processor provided in the printer 30. A ROM 42, a RAM 43, a second feed drive portion 51, a display control portion 52, an input detection portion 53 and a universal serial bus (USB) host controller 60 are connected to the CPU 41 via a bus 44. As will be described later, the CPU 41 functions as a first position acquisition portion 45, a control data output portion 47 and a second feed control portion 48, by executing programs stored in the ROM 42. The first position acquisition portion 45 acquires a current position of the carriage 34. The control data output portion 47 outputs print data to each of discharge control portions using a communication ID that corresponds to a unique ID. The print data is data to discharge liquid by the discharge port group connected to the discharge control portion. The discharge control portion is connected to at least one of the discharge port groups 361 and controls a discharge operation of the connected discharge port group 361. The discharge control portions of the present embodiment are a first discharge control portion 78 of the second control portion 70 and a second discharge control portion 95 of the third control portion 90 that will be explained in more detail later. The unique ID and the communication ID will be explained in more detail later. The second feed control portion 48 controls the second feed drive portion 51 and thereby causes the platen 39 to move.

Various programs, such as a printing control program to control operations of the printer 30, various initial values and the like are stored in the ROM 42. Various types of data, such as print data received from the PC 1, are temporarily stored in the RAM 43. The print data of the present embodiment indicates data to discharge the white ink as well as data to discharge the color inks. The discharge of the white ink is performed by the four discharge port groups 361W of the first unit 351 that is connected to the second control portion 70.

The discharge of the color inks is performed by the four discharge port groups 361C, 361M, 361Y and 361K of the second unit 352 that is connected to the third control portion 90. More specifically, the print data is known data including data that indicates a discharge amount per discharge shot and a discharge position when the white ink is discharged from each of the four discharge port groups 361W and data that indicates a discharge amount per discharge shot and a discharge position when the color ink is discharged from each of the four discharge port groups 361C, 361M, 361Y and 361K. The discharge amount per discharge shot may be represented by two values, i.e., "1: discharge" and "2: non-discharge", or may be represented by data of three or more values. The discharge position corresponds to the current position of the carriage 34. The CPU 41 associates the data to discharge the white ink with the unique ID ("1" for example) of the second control portion 70 (the first discharge control portion 78). The CPU 41 associates the data to discharge the color ink with the unique ID ("2" for example) of the third control portion 90 (the second discharge control portion 95). The unique ID is an identifier that is set in advance for each of the discharge control portions in order to identify each of the plurality of discharge control portions.

The second feed drive portion 51 drives the sub-scanning motor 56 that causes the platen 39 to move in the sub-scanning direction. The display control portion 52 controls display of a display 57 in accordance with an instruction from the CPU 41. The input detection portion 53 detects information and instructions that are input via operation buttons 58. Although not shown in the drawings, the operation buttons 58 include a printing start button that is used to input an instruction to start the print processing, which will be described later with reference to FIG. 6, a printing stop button that is used to input an instruction to stop the print processing, and ten-keys that are used to input values. The user can input various types of information and instructions using the operation buttons 58. The USB host controller 60 is a host controller that conforms to the USB 2.0 standard.

The USB hub 61 is connected to the USB host controller 60. The USB hub 61 is a connection device that includes a single first connection port 62, second connection ports 63 and 64, and a third connection port 65. The first connection port 62 is an upstream side port, and can be connected to the CPU 41 via the USB host controller 60 and the bus 44. The two second connection ports 63 and 64 are downstream side ports, and are respectively connected to the second control portion 70 and the third control portion 90. More specifically, the second connection port 63 can be connected to a CPU 71 via a USB controller 72. The second connection port 64 can be connected to a CPU 91 via a USB controller 92. The third connection port 65 is a downstream side port, and can be connected to a USB device 110 that is an external device. The USB device 110 is, for example, a USB flash memory and a hard disk.

Note that, in the present embodiment it is assumed that, when using the printer 30, the user does not remove the second control portion 70 and the third control portion 90 that are connected to the second connection ports 63 and 64 of the USB hub 61. However, in accordance with a specification change, such as version upgrade of the printer 30, another discharge control portion that controls discharge port groups other than the eight discharge port groups 361 may be connected to the second connection port. For example, in addition to the discharge port groups 361C, 361M, 361Y and 361K for discharging the color ink for post-treatment, a fourth control portion may be connected via another second connection port of the USB hub 61, in order to increase the types of the color ink for post-treatment. The fourth control portion controls a discharge port group that discharges light cyan ink, a discharge port group that discharges light magenta ink, a discharge port group that discharges yellow ink, a discharge port group that discharges black ink, and the like. Further, for example, the second control portion 70 and the third control portion 90 may be replaced with a fifth control portion and a sixth control portion, respectively, and the fifth control portion and the sixth control portion may be connected to the second connection ports of the USB hub 61. The fifth control portion controls a discharge port group that discharges a pretreatment agent for discharge printing, and the sixth control portion controls a discharge port group that discharges post-treatment color ink for discharge printing. When the functions of the printer 30 are enhanced in this manner, it is sufficient that the control portion including the corresponding discharge port group and the discharge control portion that controls the corresponding discharge port group is connected to the CPU 41 via the second connection port of the USB hub 61. Therefore, in the printer 30, modifications, such as enhancement of the functions of the printer 30, are possible without significantly changing the program etc. of the ROM 42 of the first control portion 40, and also without the user changing the printer 30 to another printer.

The USB hub 61 is provided with a USB hub controller 66. The USB hub controller 66 performs detection of the USB devices that are connected to the second connection ports 63 and 64 and to the third connection port 65, detection of a data transmission speed, conversion of the data transmission speed, data distribution, and management of the power supply to the USB devices. In accordance with an instruction from the USB host controller 60, the USB hub controller 66 connects the first connection port 62 and one of the plurality of second connection ports 63 and 64 and the third connection port 65 such that data transmission is possible. The USB hub controller 66 performs data transmission/reception between the USB host controller 60 connected to the first connection port 62 and the USB device connected to one of the plurality of second connection ports 63 and 64 and the third connection port 65.

The second control portion 70 is provided with the CPU 71, the USB controller 72, a first feed drive portion 73 and a first discharge drive portion 74 that are mounted on a system-on-a-chip (SoC). The CPU 71 is a second processor provided in the printer 30, and performs overall control of the second control portion 70 in accordance with data output from the CPU 41 and programs stored in a ROM 84, which will be described later. The CPU 71 is electrically connected to each of the USB controller 72, the first feed drive portion 73 and the first discharge drive portion 74. As will be described later, the CPU 71 executes the programs stored in the ROM 84 and thereby functions as a second position acquisition portion 76, a first feed control portion 77 and the first discharge control portion 78. The second position acquisition portion 76 acquires the current position of the carriage 34. The first feed control portion 77 controls the first feed drive portion 73 and thereby causes the carriage 34 to move. The first discharge control portion 78 controls the discharge of the white ink by the four discharge port groups 361W of the first unit 351, based on the print data output by the control data output portion 47. An ID management portion 97 matches a communication ID that is stored in a register 79, which is a storage device provided in the USB controller 72 (which will be explained later) with the unique ID that is stored in the ROM 84.

The USB controller 72 is a controller that conforms to the USB 2.0 standard, and is connected to the second connection port 63 of the USB hub 61. The USB controller 72 is provided with the register 79 in which the communication ID assigned to the second control portion 70 (the first discharge control portion 78) is stored, and the USB controller 72 performs data transmission/reception with the first control portion 40 that is connected to the first connection port 62 of the USB hub 61. The communication ID is an identifier that is assigned to a device when the USB host controller 60 detects that the device has been connected to the second connection port 63 or 64 of the USB hub 61. In the present embodiment, the communication ID is assigned to the second control portion 70 and the third control portion 90 which are connected to the second connection ports 63 and 64 and to the USB device 110 that is connected to the third connection port 65. The communication ID) is used in processing to transmit data between the CPU 41 of the first control portion 40 and the CPU 71 of the second control portion 70, between the CPU 41 of the first control portion 40 and the CPU 91 of the third control portion 90, and between the first control portion 40 and the USB device 110. Therefore, it can also be said that the communication ID is assigned to the CPU 71 of the second control portion 70 and to the CPU 91 of the third control portion 90 which are connected to the second connection ports 63 and 64. When the print processing is performed, the communication ID is used in processing to transmit data, via the USB hub 61, between the control data output portion 47 and the discharge control portions 78 and 95. The first feed drive portion 73 drives the main scanning motor 83 that causes the carriage 34 to move in the main scanning direction. The first discharge drive portion 74 drives a piezoelectric element (not shown in the drawings) that is provided on each of the discharge channels of the four discharge port groups 361W, and thereby causes each of the four discharge port groups 361W included in the first unit 351 to discharge the white ink. The second control portion 70 is further provided with the ROM 84 and a RAM 85 that are connected to the CPU 71. Various programs, such as a printing control program to control operations of the second control portion 70, various initial values and the like are stored in the ROM 84. For example, "1" is stored in the ROM 84 as the unique ID assigned to the second control portion 70 (the first discharge control portion 78). The unique ID matches the unique ID associated with the print data. Specifically, the unique ID "1" stored in the ROM 84 matches the unique ID "1" associated with the print data of the white ink output by the control data output portion 47 to the first discharge control portion 78. Various types of data, such as print data received from the CPU 41, are temporarily stored in the RAM 85. The CPU 41 and the second control portion 70 are electrically connected via the bus 44 on the first control portion 40 side, the USB host controller 60 and the USB hub 61.

The third control portion 90 is provided with the CPU 91, the USB controller 92 and a second discharge drive portion 93 that are mounted on a SoC other than the SoC of the second control portion 70. The CPU 91 is a third processor provided in the printer 30, and similarly to the CPU 71, the CPU 91 performs overall control of the third control portion 90 in accordance with data output from the CPU 41 and programs stored in a ROM 87, which will be described later. The CPU 91 is connected to the USB controller 92 and the second discharge drive portion 93. As will be described later, the CPU 91 executes the programs stored in the ROM 87 and thereby functions as a second position acquisition portion 94, the second discharge control portion 95 and an ID management portion 98. The second position acquisition portion 94 acquires the current position of the carriage 34. The second discharge control portion 95 controls the discharge of the color inks by the four discharge port groups 361C, 361M, 361Y and 361K of the second unit 352. The ID management portion 98 matches a communication ID that is stored in a register 96, which is a storage device provided in the USB controller 92 (which will be explained later), with the unique ID that is stored in the ROM 87.

The USB controller 92 is a controller that conforms to the USB 2.0 standard, and is connected to the second connection port 64 of the USB hub 61. The USB controller 92 is provided with the register 96 in which the communication ID assigned to the third control portion 90 (the second discharge control portion 95) is stored, and the USB controller 92 performs data transmission/reception with the first control portion 40 that is connected to the USB hub 61. The second discharge drive portion 93 drives a piezoelectric element (not shown in the drawings) that is provided on each of the discharge channels of the four discharge port groups 361C, 361M, 361Y and 361K, and thereby causes the four discharge port groups 361C, 361M, 361Y and 361K to discharge the color inks. Further, the third control portion 90 is provided with the ROM 87 and a RAM 88 that are connected to the CPU 91. Various programs, such as a printing control program to control operations of the third control portion 90, various initial values and the like are stored in the ROM 87. For example, "2" is stored in the ROM 87 as the unique ID assigned to the third control portion 90 (the second discharge control portion 95). The unique ID "2" stored in the ROM 87 matches the unique ID "2" associated with the print data of the color ink output by the control data output portion 47 to the second discharge control portion 95. Various types of data, such as print data received from the CPU 41, are temporarily stored in the RAM 88. The CPU 41 and the third control portion 90 are connected via the bus 44 on the first control portion 40 side, the USB host controller 60 and the USB hub 61.

The printer 30 is further provided with a main power supply portion 81. The main power supply portion 81 supplies power to each of the first control portion 40, the second control portion 70 and the third control portion 90. More specifically, the power is supplied from the main power supply portion 81 to each of the second control portion 70 and the third control portion 90 without going through the USB hub 61. The main power supply portion 81 introduces power into the printer 30 from a commercial power supply (not shown in the drawings) via an outlet and a power cord. The main power supply portion 81 is configured such that the power supply to each of the first control portion 40, the second control portion 70 and the third control portion 90 can be shut off, if necessary. The second control portion 70 and the third control portion 90 can stably perform control of the drive portions using the power that is converted into a necessary voltage, as appropriate, and that is directly supplied from the main power supply portion 81.

The printer 30 is further provided with an encoder 82. The encoder 82 is a linear encoder that detects a pattern of encoder strips provided along a feed direction (the main scanning direction) of the carriage 34 (refer to FIG. 1), using an optical sensor fixed to the carriage 34, and outputs a pulse signal indicating a detection result. The carriage 34 is moved to one end of each of the guide rails 33 (refer to FIG. 1) by turning on the main power supply portion 81 of the printer 30. At this time, the printer 30 initializes the current position of the carriage 34. When the carriage 34 is moved on the guide rails 33 from the initial position, the encoder 82 inputs the pulse signal that is based on the detection result to each of the first position acquisition portion 45, the second position acquisition portion 76 and the second position acquisition portion 94. When the pulse signal is input from the encoder 82, the first position acquisition portion 45 updates the current position of the carriage 34. In a similar manner, when the pulse signal is input from the encoder 82, the second position acquisition portions 76 and 94 update the current position of the carriage 34.

Processing performed by the printer 30 having the above-described configuration will be explained. First, main processing that is performed by the first control portion 40 will be explained with reference to FIG. 4. In the main processing, processing that assigns the communication ID to each of the second control portion 70 and the third control portion 90 that are connected to the first control portion 40 via the USB hub 61 and processing corresponding to various commands, such as a command to start printing, are performed. In order to simplify the explanation, it is assumed that an external device is not connected to the third connection port 65 when the main processing is started. After the supply of power is started to the first control portion 40 by the main power supply portion 81, when the first control portion 40 is activated, the main processing is mainly performed by the CPU 41 in accordance with the program stored in the ROM 42. Part of the main processing is performed by the USB host controller 60 in accordance with a USB protocol.

Figure 4:
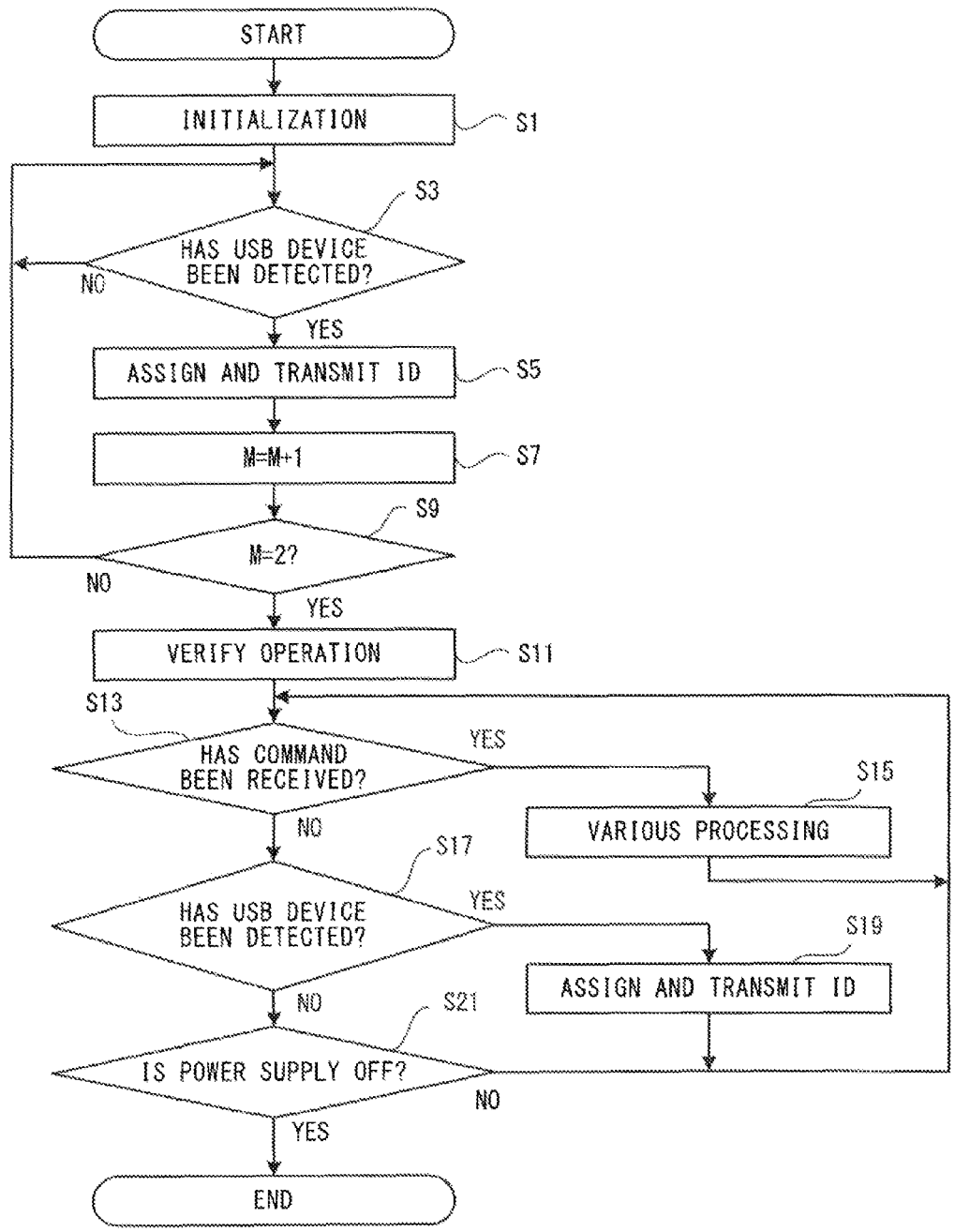
FIG. 4 is a flowchart of main processing.

As shown in FIG. 4, in the main processing, the CPU 41 initializes the first control portion 40 (step S1). In the processing at step S1, for example, processing is performed to expand the programs stored in the ROM 42 to the RAM 43. Further, in the processing at step S1, a variable M is set to 0. The variable M is a variable used to count a number of the discharge control portions to which the communication ID is assigned. Next, the CPU 41 determines whether or not the USB device has been detected (step S3). For example, the USB hub controller 66 detects the USB device when a voltage value of signal lines of the second connection ports 63 and 64 and the third connection port 65 has reached a certain value, and notifies a detection result to the USB host controller 60. The certain voltage value is, for example, a voltage that is necessary to activate the USB device that will be explained later. The USB host controller 60 outputs the notification content to the CPU 41. As a result, when the CPU 41 receives the notification content output by the USB host controller 60, the CPU 41 determines that the USB device has been detected. The USB host controller 60 starts bus enumeration with the detected USB device, and acquires various pieces of information relating to the USB device. The bus enumeration is processing that is performed by the device on the host side when the connection of the USB device has been detected, and is also processing that acquires information from the USB device in order for the device on the host side to determine what kind of USB device is connected. When the USB device is recognized by the device on the host side by the bus enumeration, an address corresponding to the USB device is assigned and a communication path is established.

When the CPU 41 does not detect the USB device (no at step S3), the determination processing at step S3 is repeated. When the USB device is detected (yes at step S3), the USB host controller 60 assigns the communication ID to the USB device that has started the bus enumeration, and transmits the assigned ID to the CPU 41 and to the detected USB device (step S5). In processing at step S5, the USB host controller 60 assigns the communication ID in accordance with an order of detection of the USB device. For example, the USB host controller 60 assigns the communication ID "1" to the USB device that is detected first, and assigns the communication ID "2" to the USB device that is detected second. In the processing at step S5, the communication ID is assigned to the second control portion 70 (the first discharge control portion 78) or to the third control portion 90 (the second discharge control portion 95). The CPU 41 causes the communication ID transmitted from the USB host controller 60 to be stored in the RAM 85. Next, the CPU 41 increments the variable M (step S7) and determines whether or not M is 2 (step S9). The processing at step S9 is performed to assign respective communication IDs to the two discharge control portions by repeating the processing at step S3, step S5 and step S7. When M is not 2 (no at step S9), there is still a discharge control portion to which the communication ID has not been assigned, and the processing thus returns to step S3. When M is 2 (yes at step S9), the respective communication IDs have been assigned to the two discharge control portions and the CPU 41 thus performs operation verification to operate the printer 30 (step S11). In the processing at step S11, for example, the CPU 41 performs a maintenance operation such as a purge.

Next, the CPU 41 determines whether or not a command has been received (step S13). A command is an instruction based on user operation information relating to various processing of the printer, such as to start printing, stop printing or execute a purge etc. When the CPU 41 has received a command (yes at step S13), the CPU 41 performs processing based on the command (step S15). After that, the processing returns to step S13. The processing that is performed when the CPU 41 has received the command to start printing will be explained later with reference to FIG. 6. When a command has not been received (no at step S13), the CPU 41 determines whether or not a new USB device has been detected (step 17). When the new USB device has been detected (yes at step S17), the USB host controller 60 assigns a communication ID to the detected USB device and transmits the assigned communication ID to the detected USB device and to the CPU 41. The CPU 41 stores the assigned communication ID (step S19). After that, the processing returns to step S13. The USB device detected at step S17 is the USB device 110 connected to the third connection port 65 of the USB hub 61. In the present embodiment, the communication ID is first assigned to the discharge control portions 78 and 95 that are connected to the second connection ports 63 and 64, and after that, the communication ID is assigned to the USB device 110 that is connected to the third connection port 65. The reason for doing this is to take into account the processing to associate the communication IDs assigned to the discharge control portions 78 and 95 with the unique IDs stored in the ROM 84 and the ROM 87. When the CPU 41 has not detected the USB device (no at step S17), the CPU 41 determines whether or not the main power supply portion 81 is off (step S21). When the main power supply portion 81 is not off (no at step S21), the processing returns to step S13. When the main power supply portion 81 is off (yes at step S21), the main processing ends. In the main processing, each of the discharge control portions 78 and 95 is assigned the unique communication ID. It is assumed that the communication ID "2" is assigned to the first discharge control portion 78 and the communication ID "1" is assigned to the second discharge control portion 95 by the main processing.

Data reception processing respectively performed by the second control portion 70 and the third control portion 90 will be explained with reference to FIG. 5. The data reception processing by the second control portion 70 is started when the second control portion 70 is activated, and is performed by the CPU 71 in accordance with the printing control program stored in the ROM 84. The data reception processing by the third control portion 90 is started when the third control portion 90 is activated and is performed by the CPU 91 in accordance with the printing control program stored in the ROM 87. Each of the second control portion 70 and the third control portion 90 is activated when the main power supply portion 81 is switched on and a designated voltage that has been converted by a power supply IC is supplied to the second control portion 70 and the third control portion 90. The designated voltage necessary for activation may be different for each of the second control portion 70 and the third control portion 90 even if it is apparently the same. For example, recommended operating conditions relating to an activation start voltage are set for each of the second control portion 70 and the third control portion 90. In general, the recommended operating conditions set values over a specific range between a minimum value and a maximum value. Each of the second control portion 70 and the third control portion 90 can be activated if a voltage of any of the values in the range of the recommended operating conditions is supplied. Thus, for example, even if activation is assumed to be at a standard value of 3.3V, in actuality, there are cases in which the voltage at the start of activation is different for each activation even if the same device is used, such as activating at a minimum value of 3.1V or activating at a maximum value of 3.4V. Further, the voltage at the start of activation may be different due to variations in the power supply IC or a difference in length of wiring from the power supply IC and so on. The data reception processing in the second control portion 70 and the data reception processing in the third control portion 90 are basically the same processing. Therefore, a case in which the data reception processing is performed in the second control portion 70 will be explained, and an explanation of a case in which the data reception processing is performed in the third control portion 90 will be omitted.

Figure 5:
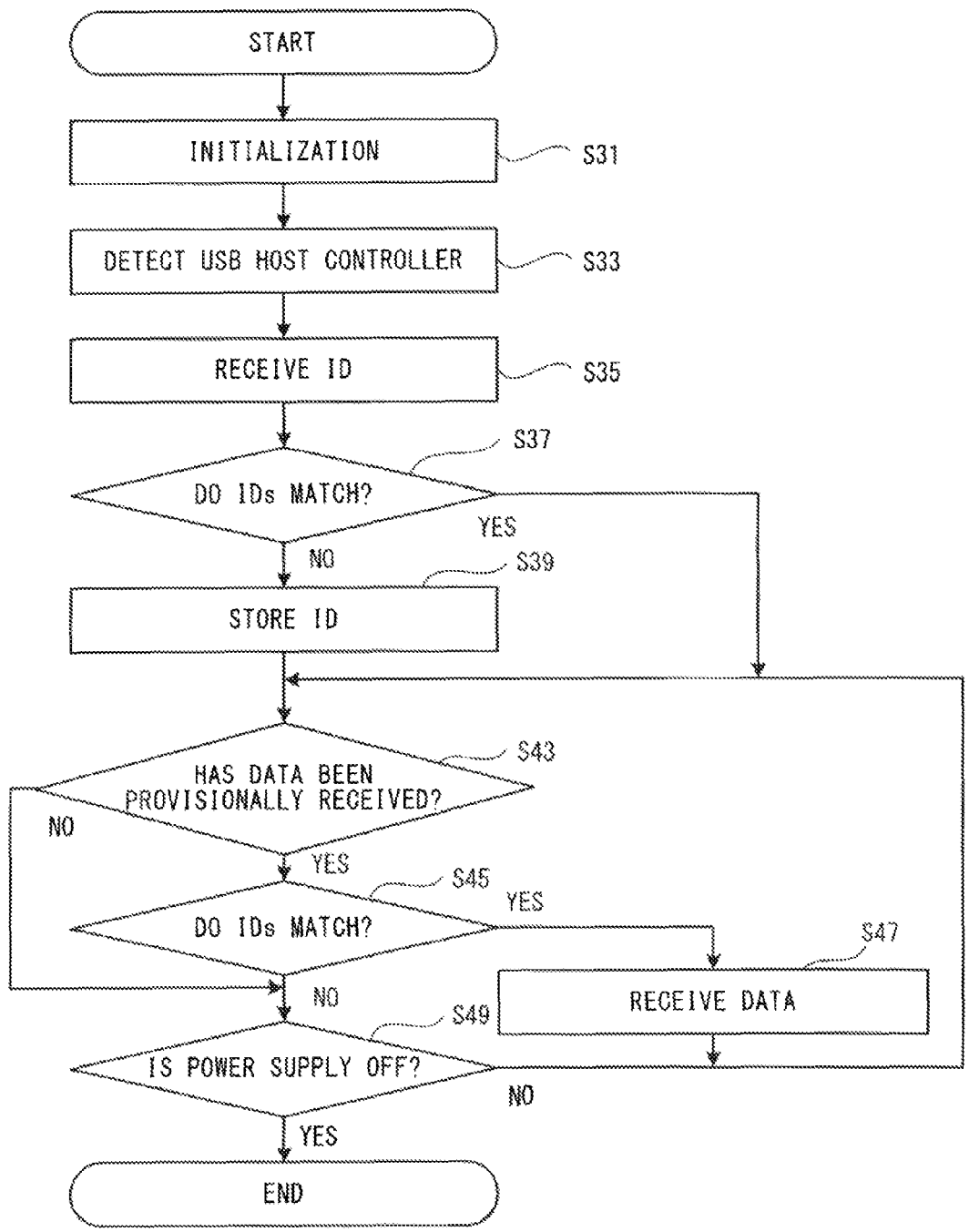
FIG. 5 is a flowchart of data reception processing.

As shown in FIG. 5, in the data reception processing, first the CPU 71 initializes the second control portion 70 (step S31). In the processing at step S31, for example, the CPU 71 performs processing to expand the programs stored in the ROM 84 to the RAM 85. Next, the CPU 71 detects the USB host controller 60 (step S33). The USB controller 72 outputs various pieces of information relating to the USB controller 72 in accordance with a query from the USB host controller 60 that has started bus enumeration. Next, when the USB controller 72 receives the communication ID transmitted by the USB host controller 60, the USB controller 72 stores the communication ID in the register 79 of the USB controller 72 (step S35). In the processing at step S35, for example, the communication ID "2" is stored in the register 79. Next, the CPU 71 (the ID management portion 97) determines whether or not the unique ID stored in the ROM 84 matches the communication ID stored in the register 79 (step S37). When the unique ID is "1" and the communication ID is "2," they do not match (no at step S37). In this case, the CPU 71 (the ID management portion 97) overwrites the communication ID stored in the register 79 with the unique ID stored in the ROM 84 (step S39). By the processing at step S39, the communication ID is overwritten to be "1" and the unique ID in the ROM 84 and the communication ID in the register 79 therefore match each other.

When the unique ID matches the communication ID (yes at step S37), or after the processing at step S39, it is determined whether or not data output from the first control portion 40 has been provisionally received (step S43). The data output from the first control portion 40 to the discharge control portion is mainly print data. Additionally, file upgrade data etc. is also included. The USB hub 61 temporarily outputs the data output from the first control portion 40 to each USB device and the USB device to which the data has been output provisionally receives the data. When the data has not been provisionally received (no at step S43), processing at step S49 that will be explained later is performed. When the data has been provisionally received (yes at step S43), the USB controller 72 stores the provisionally received data to a reception buffer of the USB controller 72. Next, the USB controller 72 determines whether or not the communication ID included in the data matches the communication ID stored in the register 79 (step S45). When the communication IDs match each other (yes at step S45), the USB controller 72 notifies the reception of the data to the CPU 71. The CPU 71 receives the data and causes it to be stored in the RAM 85, and performs processing in accordance with the received data (step S47). More specifically, when the received data is print data, after the print data stored in the reception buffer of the USB controller 72 has been decompressed and analyzed etc., the print data is stored in a data buffer provided in the RAM 85 of the second control portion 70. When the communication IDs do not match each other (no at step S45), the data stored in the reception buffer of the USB controller 72 is deleted. Next, the CPU 71 determines whether or not the main power supply portion 81 has been switched off (step S49). When the main power supply portion 81 has not been switched off (no at step S49), the processing returns to step S43. When the main power supply portion 81 has been switched off (yes at step S49), the data reception processing ends.

Figure 6:
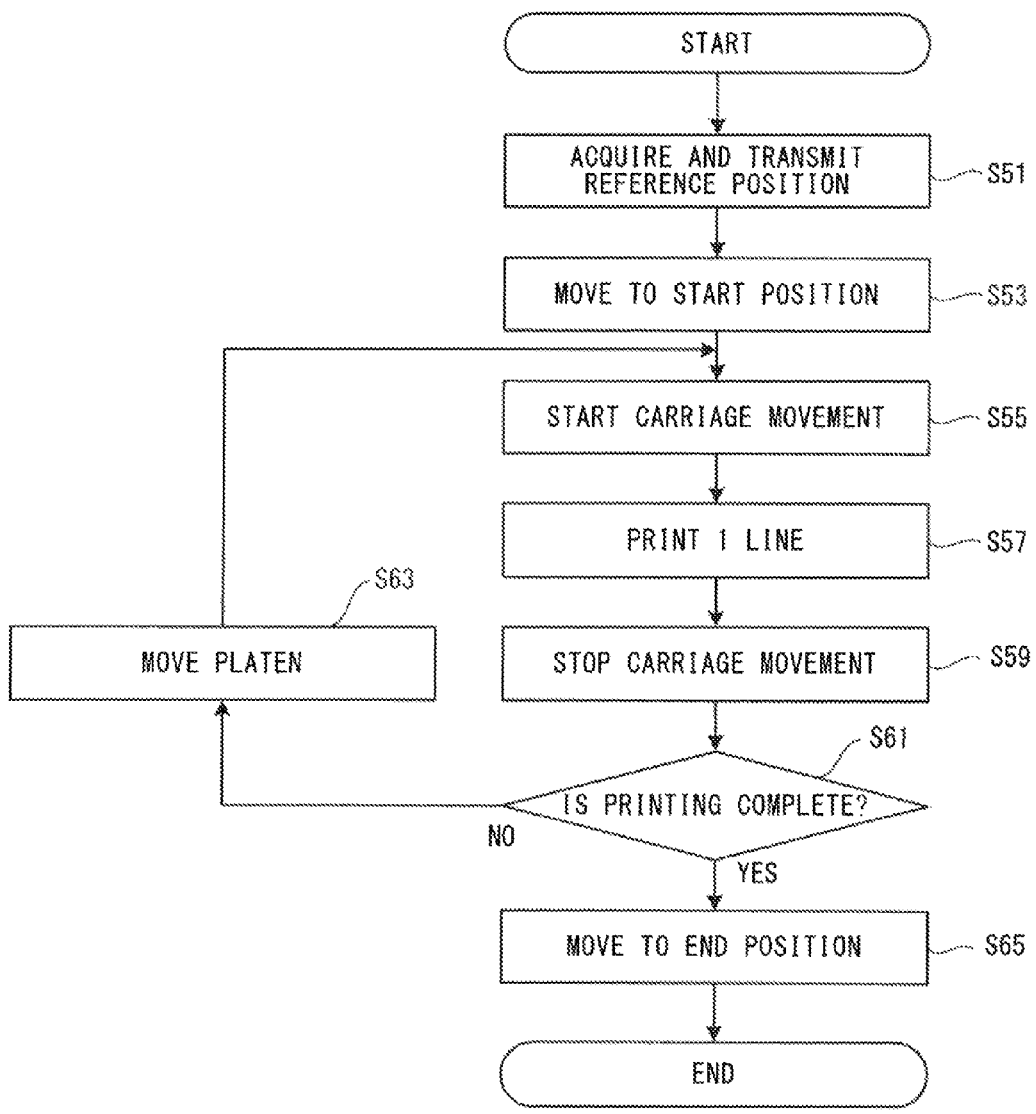
FIG. 6 is a flowchart of print processing.

Next, the print processing that is performed by the printer 30 will be briefly explained with reference to FIG. 6. With the printer 30 of the present embodiment, after the print data has been received from the PC 1, when the user places a fabric on the platen 39 and depresses the printing start button, the printing start command is detected in processing at step S13 shown in FIG. 4 and the print processing shown in FIG. 6 is performed. The print data may be acquired from another external device, such as the USB flash memory that is the USB device 110. The print processing is executed by the CPU 41, the CPU 71 and the CPU 91 operating in cooperation with each other in accordance with the programs that are respectively stored in the ROM 42, the ROM 84 and the ROM 87.

As shown in FIG. 6, in the print processing, first, the CPU 41 (the first position acquisition portion 45) acquires, as a reference position, the current position of the carriage 34 that is stored in a register of the first acquisition portion 45. Then, the CPU 41 outputs the acquired reference position to the second control portion 70 and the third control portion 90 via the USB hub 61 (step S51). The second position acquisition portion 76 of the second control portion 70 and the second position acquisition portion 94 of the third control portion 90 that have received the reference position respectively update the current position of the carriage 34.

Next, the CPU 41 (the second feed control portion 48) outputs an instruction to the second feed drive portion 51 and causes the platen 39 to move in the sub-scanning direction so that the discharge port groups 361 that discharge the white ink are in a printing start position on the feed path (step S53). The CPU 71 (the first feed control portion 77) drives the first feed drive portion 73 based on an instruction from the CPU 41, and causes the carriage 34 to move in the main scanning direction to the start position (step S53). Next, the printer 30 starts processing that moves the carriage 34 in the main scanning direction (step S55). The instruction to start processing at step S55 is output by the CPU 41 to the CPU 71 (the first feed control portion 77) of the second control portion 70 via the USB hub 61. The CPU 71 (the first feed control portion 77) that has received the instruction controls the first feed drive portion 73, starts feed control of the carriage 34, and causes the carriage 34 to move at a certain speed.

Next, the printer 30 performs printing of one line while moving the carriage 34 in the main scanning direction (step S55, step S57). Immediately after the start of the printing, the discharge of the white ink only is performed by the discharge port groups 361W in accordance with data of white (W) in the print data (CMYKW). When the discharge port groups 361C, 361M, 361Y and 361K are moved to an area onto which the white ink has been discharged by the discharge port groups 361W, the discharge of the white ink and the discharge of the color inks are performed in parallel while the carriage 34 is being moved in the main scanning direction. The discharge of the white ink is performed by the discharge port groups 361W in accordance with the data of white (W) in the print data (CMYKW). The discharge of the color inks is performed by the discharge port groups 361C, 361M, 361Y and 361K in accordance with data of colors (CMYK) in the print data (CMYKW). Immediately before the end of the printing, the discharge of the white ink is completed, and the discharge of the color inks only is performed by the discharge port groups 361C, 361M, 361Y and 361K in accordance with the data of the colors (CMYK) in the print data (CMYKW).

As will be explained later with reference to FIG. 7, when performing the processing at step S57, the CPU 41 (the control data output portion 47) uses the communication ID corresponding to the unique ID and outputs the print data corresponding to the unique ID to the CPU 71 (the first discharge control portion 78) of the second control portion 70 and the CPU 91 (the second discharge control portion 95) of the third control portion 90, respectively, via the USB hub 61. As explained above with reference to FIG. 5, in the present embodiment, when the communication ID transmitted from the USB host controller 60 is different to the unique ID of each of the discharge control portions 78 and 95, the ID management portions 97 and 98 perform the processing that causes the communication ID and the unique ID to match each other. As a result, the CPU 41 (the control data output portion 47) uses the communication ID corresponding to the unique ID (namely, uses the communication ID matching the unique ID) and outputs the print data. Through processing at step S43, step S45 and step S47 shown in FIG. 5, each of the CPU 71 (the first discharge control portion 78) and the CPU 91 (the second discharge control portion 95) receives the print data output by the CPU 41. Based on the received print data and on the current position of the carriage 34 acquired by the second position acquisition portions 76 and 94, each of the CPU 71 (the first discharge control portion 78) and the CPU 91 (the second discharge control portion 95) controls processing that discharges ink from the discharge ports 36 to the discharge position that is specified by the print data. The reference positions of the second position acquisition portions 76 and 94 are matched by the above-described processing at step S51. Each of the second position acquisition portions 76 and 94 updates the current position of the carriage 34 based on the detection signal input from the same encoder 82. Therefore, by determining the discharge position based on the current position of the carriage 34 acquired by the second position acquisition portions 76 and 94, the discharge processing of the white ink that is performed by the second control portion 70 is synchronized with the discharge processing of the color inks that is performed by the third control portion 90. The discharge processing is processing to discharge liquid based on the print data.

After step S57, the CPU 71 (the first feed control portion 77) of the second control portion 70 controls the first feed drive portion 73 and stops the movement of the carriage 34 (step S59). Next, when the printing is not completed (no at step S61), the CPU 41 (the second feed control portion 48) outputs an instruction to the second feed drive portion 51 and causes the platen 39 to move by an amount corresponding to a printing method (step S63). The processing returns to step S55. Examples of the printing method include a method that uses a multi-pass system and a method that uses a single-pass system. The multi-pass system is a system that performs printing by scanning the print head 35 a plurality of times in the same area so that one pixel column is formed by the different discharge ports 36 of the same print head 35 (the discharge port group 361) with respect to each of pixel columns. The single-pass system is a system that performs printing by scanning the same print head 35 once for each of the pixel columns. When the printing is completed (yes at step S61), the CPU 41 (the second fed control portion 48) outputs an instruction to the second feed drive portion 51 and causes the platen 39 to move forward to a position where the fabric can be removed. The CPU 71 (the first feed control portion 77) drives the first feed drive portion 73 based on the instruction from the CPU 41 and causes the carriage 34 to move to an end position (step S65). The print processing thus ends.

Note that, as explained in the above-described print processing, the printer 30 of the present embodiment causes the carriage 34 to move in the main scanning direction and also causes the platen 39 to move in the sub-scanning direction. Thus, the printer 30 causes the carriage 34 to move relatively with respect to the platen 39 (the print medium placed on the platen 39). However, it is sufficient that the printer 30 can move the carriage 34 relatively with respect to the platen 39, and a specific feed method is not limited to the method of the present embodiment. More specifically, it is possible to adopt a method in which the platen 39 is moved in the main scanning direction and the carriage 34 is moved in the sub-scanning direction, a method in which the platen 39 only is moved in the main scanning direction and the sub-scanning direction, and a method in which the carriage 34 only is moved in the main scanning direction and the sub-scanning direction.

Next, print data output processing will be explained with reference to FIG. 7. The print data output processing shown in FIG. 7 is processing which is executed by the CPU 41 and which is included in the processing at step S57 shown in FIG. 6 that is executed by the CPU 41, the CPU 71 and the CPU 91 operating in cooperation with each other. Specifically, in the print data output processing shown in FIG. 7, the CPU 41 performs processing that outputs the print data to each of the discharge control portions. The print data output processing is started when the printer 30 receives the print data from the PC 1 similarly to the print processing shown in FIG. 6, and is performed by the CPU 41 (the control data output portion 47) in accordance with the printing control program stored in the ROM 42. Note that it is assumed that data, variables, setting values and the like that are acquired in the course of the processing are stored in the RAM 43 as appropriate.

Figure 7:
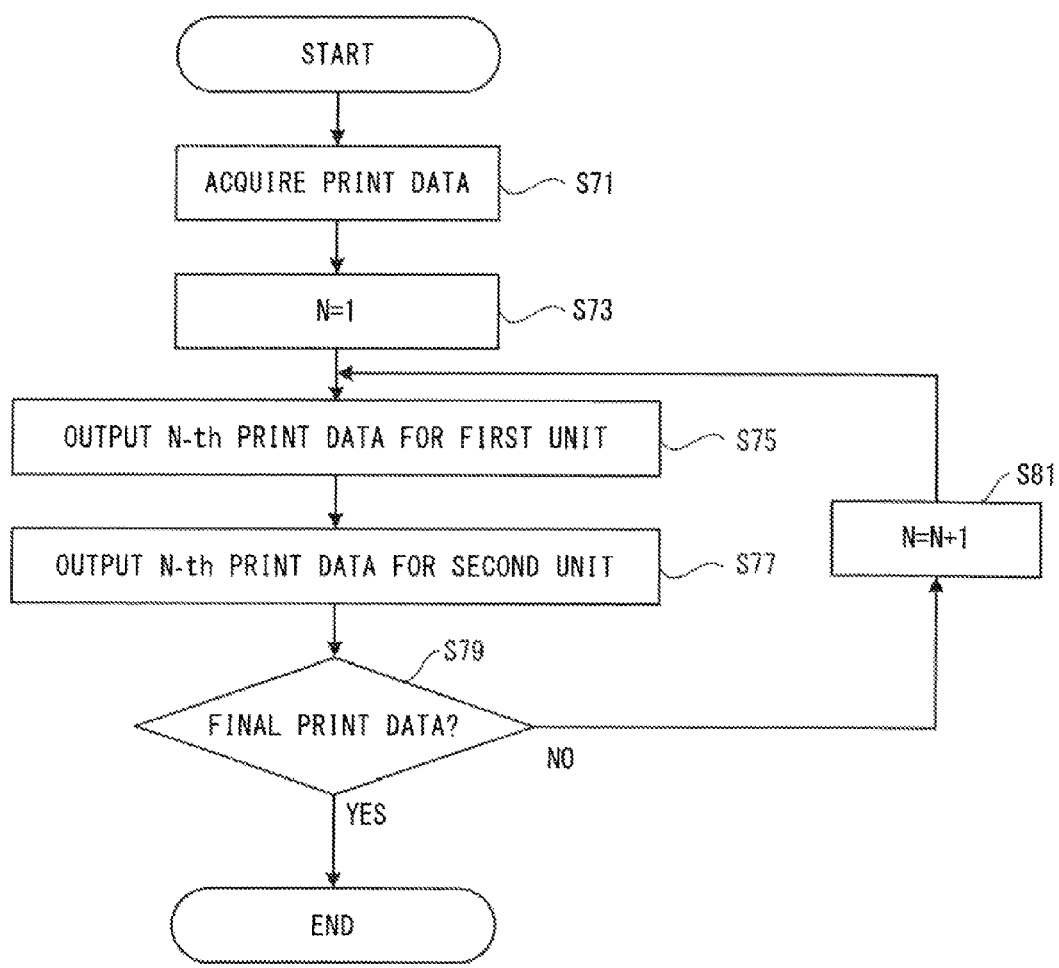
FIG. 7 is a flowchart of print data output processing.

As shown in FIG. 7, the CPU 41 acquires the print data received from the PC 1 and stores the print data in the RAM 43 (step S71). It is assumed that the print data is generated on the PC 1 by an instruction from the user. Next, the CPU 41 sets a variable N, which is used to read out the print data sequentially in a printing order, to 1 (step S73). The CPU 41 divides and outputs the print data, a plurality of times, to the second control portion 70 and the third control portion 90. The amount of print data that is output each time is determined in advance and stored in a nonvolatile storage device, such as the ROM 42. In the present embodiment, the amount of print data that is output each time is print data corresponding to three lines. The amount of print data that is output each time may be changed as appropriate.

Next, from among the print data stored in the RAM 43, the CPU 41 acquires N-th print data for the four discharge port groups 361W of the first unit 351. The CPU 41 outputs the acquired print data to the second control portion 70 via the bus 44 on the first control portion 40 side, the USB host controller 60 and the USB hub 61 (step S75). The print data corresponding to three lines, for example, is output by the processing at step S75. When the print data is output, in addition to the communication ID "1" that indicates an output destination, data indicating the following items, for example, may be added. When the print data for which the variable N is 1 is output, data is added relating to the size (data size) of all the print data for the first unit 351 that is necessary to form one image by the print processing. For example, in the above-described data reception processing, this data is referred to when it is determined whether or not all the print data has been received. Further, data representing the variable N is added. This data is used to determine whether or not the print data is output in the printing order.

After the print data has been output to the second control portion 70, the CPU 41 acquires N-th print data for the four discharge port groups 361C, 361M, 361Y and 361K of the second unit 352, from among the print data stored in the RAM 43. The CPU 41 outputs the acquired print data to the third control portion 90 via the bus 44 on the first control portion 40 side, the USB host controller 60 and the USB hub 61 (step S77). The print data corresponding to for example, three lines (the same amount as in the processing at step S75) is output by the processing at step S77. When the print data is output, the CPU 41 adds the communication ID "2" that indicates the output destination. Data to be added when the print data is output, such as data relating to the size of all the print data for the second unit 352, is similar to that described in the processing at step S75.

Next, the CPU 41 determines whether or not the print data which is last in the printing order has been output (step S79). When all the print data acquired at step S71 has not been output (no at step S79), the CPU 41 increments the variable N (step S81). Next, the processing returns to step S75. When all the print data acquired at step S71 has been output (yes at step S79), the print data output processing is terminated.

Figure 8:
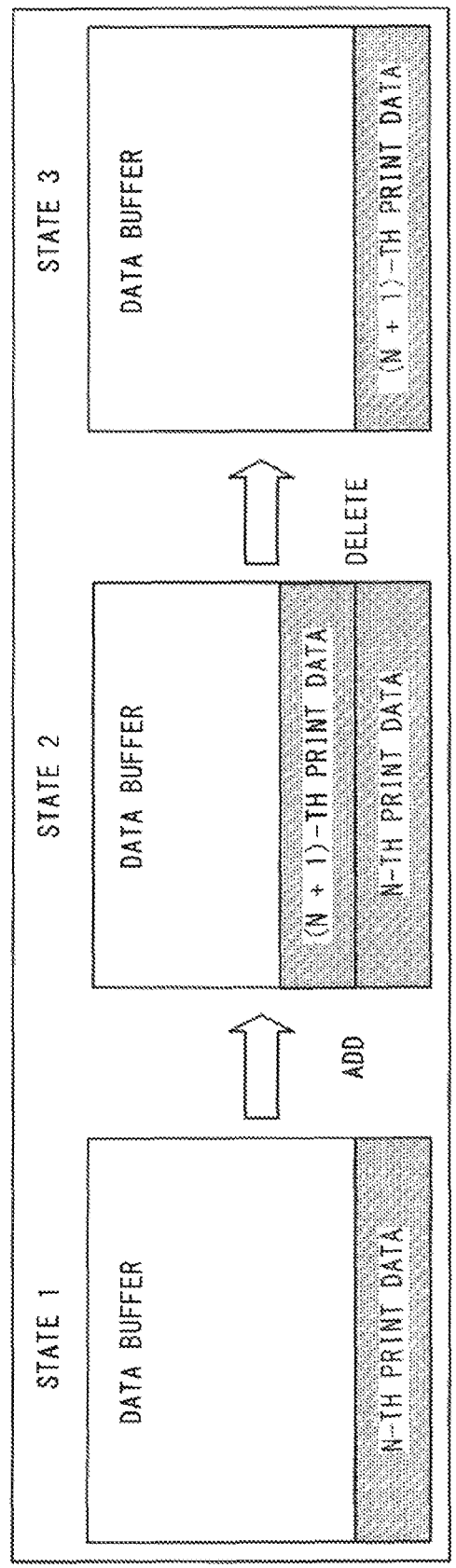
FIG. 8 is an explanatory diagram of a data buffer.

Note that, as described above, discharge processing for printing of one line at step S57 shown in FIG. 6 is performed by the second control portion 70 and the third control portion 90 in accordance with the print data received in the data reception processing shown in FIG. 5 and in accordance with the current position of the carriage 34 acquired by the second position acquisition portions 76 and 94. In the second control portion 70 and the third control portion 90, when (N+1)-th print data is newly received in a state in which the N-th print data is stored in the data buffer as shown by State 1 in FIG. 8, the (N+1)-th print data is added to the data buffer, as shown by State 2. Meanwhile, when the discharge processing based on the N-th print data ends in a state in which the N-th and the (N+1)-th print data are stored in the data buffer as shown in by State 2 in FIG. 8, the N-th print data is deleted from the data buffer.

The printer 30 that has been described in detail above uses the communication ID corresponding to the unique ID and outputs to each of the discharge control portions the print data corresponding to the unique ID, via the USB hub 61. Specifically, as an activation timing of the discharge control portions 78 and 95 of the printer 30 is not necessarily the same for each activation, an order of activation of the discharge control portions 78 and 95 may differ at each activation. In this type of case, the USB controller 72 assigns the communication ID in the order of detection, in accordance with the USB protocol, and there is a risk that a different communication ID may be assigned to the same discharge control portion at each activation. In the above-described embodiment, for example, there is a case in which the communication ID "1" and the communication ID "2" are respectively assigned to the second control portion 70 (the first discharge control portion 78) and the third control portion 90 (the second discharge control portion 95), and a case in which the communication ID "2" and the communication ID "1" are respectively assigned. When the voltage or the electric current necessary for activation is different for the discharge control portions 78 and 95, it is difficult to control a timing at which each of the discharge control portions is activated by controlling a timing at which the supply of electric power is started. With this type of the printer 30, a correspondence between the communication ID and the discharge control portion is not necessarily always the same, and it is possible that the control data output portion 47 may erroneously transmit the print data when the print data is output using the communication ID.

In order to avoid the above-described erroneous transmission, the communication IDs stored in the registers 79 and 96 of the USB controllers 72 and 92 are matched with the unique IDs stored in advance in the ROM 84 and the ROM 87. As a result, the printer 30 can reliably avoid a situation in which the print data output via the USB hub 61 from the control data output portion 47 is erroneously transmitted due to the communication ID that is different to the unique ID being assigned to each of the discharge control portions by the USB host controller 60 of the first control portion 40. In the printer 30, the first discharge control portion 78 performs the discharge of the white ink for pretreatment, and the second discharge control portion 95 performs control of the discharge of the color inks for post-treatment. In the printer 30, if the second discharge control portion 95 receives the print data for the first unit 351 or the first discharge control portion 78 receives the print data for the second unit 352, the print quality clearly deteriorates. The printer 30 can reliably avoid a deterioration in the print quality caused by this type of erroneous transmission of the print data.

The control data output portion 47 of the printer 30 is connected to the first discharge control portion 78 and the second discharge control portion 95 via the USB hub 61, and thus it is possible to improve a degree of design freedom of processing portions of the printer 30. When it is desired to add a processing portion or a device controlled by the control data output portion 47, these can be easily added via the second connection ports 63 and 64 of the USB hub 61 and extendibility is improved in comparison to known printers.

The printer of the present disclosure is not limited to the above-described embodiment, and various modifications may be made within the scope and spirit of the present disclosure. For example, the following modifications (A) to (F) may be made as appropriate.

(A) The configuration of the printer 30 may be changed as appropriate. For example, the following modifications (A-1) and (A-2) may be made.

(A-1) It is sufficient that the liquid that can be discharged by the discharge ports is a liquid having a property, such as viscosity, that allows the liquid to be discharged by the discharge ports. Therefore, the liquid is not limited to ink and may be a chemical agent, such as a decolorant, for example. The number of the discharge port groups and the discharge control portions may be changed as appropriate. All the plurality of discharge control portions need not necessarily be connected to the control data output portion via a connection device, such as the USB hub. More specifically, at least one of the discharge control portions may be connected to the control data output portion without going through the connection device. The number of the discharge port groups included in one discharge unit may be one or more.

Print heads and discharge port groups mounted on a carriage according to a modified example will be explained with reference to FIG. 9. As shown in FIG. 9 (A), a carriage 341 of the modified example is provided with print heads 356, 357 and 358. The print heads 357 and 358 are arranged in positions separated from the print head 356 such that the print heads 357 and 358 face the print head 356 in the main scanning direction. The plurality of discharge ports 36 provided on the print heads 356, 357 and 358 are grouped into a first unit 355 and a second unit 359. The first unit 355 is provided with two discharge port groups 362W that discharge white ink for pretreatment. The two discharge port groups 362W are provided on a bottom surface of the print head 356. The two discharge port groups 362W are arranged side by side in the main scanning direction. The second unit 359 is provided with four discharge port groups 362C, 362M, 362Y and 362K that each discharge color ink for post-treatment. The two discharge port groups 362C and 362M are provided on a bottom surface of the print head 358, and the two discharge port groups 362Y and 362K are provided on a bottom surface of the print head 357. The discharge port group 362C discharges cyan ink. The discharge port group 362M discharges magenta ink. The discharge port group 362Y discharges yellow ink. The discharge port group 362K discharges black ink. For example, the first unit 355 is controlled by a second control portion 701 that is provided with a first discharge control portion, and the second unit 359 is controlled by a third control portion 901 that is provided with a second discharge control portion.

As shown in the modified example shown in FIG. 9, one print head may include a plurality of discharge port groups. The number of the discharge port groups controlled by one discharge control portion may be one or more. Therefore, when a plurality of the discharge port groups are provided on one print head, each of the discharge port groups may be controlled by the same discharge control portion, or may be controlled by the discharge control portions that are different from each other. More specifically, in the carriage 341 that is similar to that shown in FIG. 9 (A), the discharge port group 362C and the discharge port group 362M that are provided on the single print head 358 may be respectively controlled by a fourth control portion 911 that is provided with a fourth discharge control portion and by a fifth control portion 912 that is provided with a fifth discharge control portion, as shown in FIG. 9 (B). Further, the discharge port group 362Y and the discharge port group 362K that are provided on the single print head 357 may be respectively controlled by a sixth control portion 913 that is provided with a sixth discharge control portion and by a seventh control portion 914 that is provided with a seventh discharge control portion. When the single print head includes a plurality of the discharge port groups, the arrangement of the respective discharge port groups is not limited to the example in which the discharge port groups are arranged side by side in the main scanning direction, and may be changed as appropriate. When a plurality of the discharge units are provided, the arrangement of the respective discharge units on the carriage 341 may be changed as appropriate.

(A-2) It is sufficient that the connection device, which connects a control data output portion and a discharge control portion, includes a first connection port that can be connected to the control data output portion, and a plurality of second connection ports that can be individually connected to the first connection port such that data transmission is possible, and the connection device is not limited to the USB hub 61. For example, an Ethernet (registered trademark) hub may be used. From a viewpoint of data transmission efficiency, it is preferable that the connection device has a switching function. However, the connection device need not necessarily have the switching function. The printer may be provided with a plurality of types of connection devices. In this case, the respective discharge control portions may be connected to the control data output portion via the different connection devices.

(B) The method for assigning the unique ID and the communication ID may be changed as appropriate. Specifically, when the method for assigning the communication ID is determined depending on an interface that accords with the connection device, the communication ID may be assigned in accordance with the assignment method depending on the connection device. When the communication ID is assigned depending on the order of detection, a timing at which the communication ID is actually assigned need not necessarily be the same as the order of detection. In another example, when the communication ID is assigned in accordance with a USB protocol, it may be possible that another USB device is detected during a period of time in which the processing to assign the communication ID to the discharge control portion is being performed. In this type of case, the following processing may be performed. For example, until the processing to assign the communication ID to the discharge control portion is complete, the USB controller may stop processing that supplies electric power to the USB device 110 from the third connection port so that the USB device 110 is not detected. In the USB protocol, the communication ID is assigned in the order of detection, but by doing as described above, it is possible to avoid assigning the communication ID that is assumed to be assigned to the discharge control portion from being assigned to the external device. In another example, it is sufficient that the unique ID be information by which it is possible to identify each of the plurality of discharge control portions, and the unique ID may be a product number, for example, or may be a combination of a plurality of pieces of information indicating the functions of the discharge control portion, such as a data transmission speed, a reception buffer capacity and the like.

(C) The processing by which the connection device detects the devices connected to the second connection ports may be changed as appropriate. For example, a physical switch may be provided on each of the second connection ports and, when the switch is switched on and off according to whether the device is connected or not connected to the second connection port, the device may be detected based on the switch. The voltage or electric current necessary for activation may be different for each of the discharge control portions or may be the same. The connection device may be able to supply electric power to the device connected to the second connection port. In this case, each of the discharge control portions may be supplied with electric power from the connection device and not from the main power supply portion 81. Additionally, the number of the second and third connection ports of the connection device may be changed as appropriate in accordance with the number of devices to be connected. When the external device is not to be connected to the connection device, the third connection port need not necessarily be provided. The number of USB devices that can be connected to the printer 30 may be changed as appropriate.

(D) The processing to associate the communication ID assigned by the USB host controller 60 with the unique ID may be changed as appropriate. For example, in the processing shown in FIG. 5, the ID management portions 97 and 98 may each ignore the communication ID received in the processing at step S35 and may cause the unique ID to be stored in the registers 79 and 96 respectively. In another example, after the ID management portions 97 and 98 have temporarily stored the communication IDs received in the processing at step S35 in the registers 79 and 96, respectively, the processing at step S39 may be performed without taking account of whether the communication ID and the unique ID match each other. Even if this is done, similarly to the above-described embodiment, it is possible to match the unique IDs respectively stored in the ROM 84 and the ROM 87 with the communication IDs stored in the registers 79 and 96. It is thus possible to avoid erroneous transmission of the print data, such as the second discharge control portion 95 receiving the print data for the first unit 351, when the control data output portion 47 uses the unique ID and outputs the print data corresponding to the unique ID, irrespective of the communication ID assigned by the USB host controller 60.

In another example, the ID management portion that performs the processing to associate the communication ID with the unique ID need not necessarily be provided in each of the second control portion 70 and the third control portion 90, and may be provided in the first control portion 40. In this case, after the USB host controller 60 has assigned the communication ID to the discharge control portions 78 and 95, the ID management portion queries the correspondence of the communication ID and the unique ID to each of the discharge control portions 78 and 95, via the USB hub 61. In response to the query from the ID management portion of the first control portion 40, the discharge control portions 78 and 95 respectively return the correspondences between the unique IDs stored in the ROM 84 and the ROM 87 and the communication IDs stored in the registers 79 and 96. The D management portion stores the correspondence between the communication ID and the unique ID returned from each of the discharge control portions 78 and 95 in the RAM 43. In this case, the control data output portion 47 may use the communication ID corresponding to the unique ID based on the correspondence stored in the RAM 43 and output the print data corresponding to the unique ID. The discharge control portions 78 and 95 can omit the processing at step S37 and step S39 shown in FIG. 5, and can receive the print data addressed to the respective discharge control portions 78 and 95 by the processing at step S43, step S45 and step S47.

(E) The program that includes instructions that cause the printer 30 to perform the main processing in FIG. 4, the data reception processing in FIG. 5, the print processing in FIG. 6 and the print data output processing in FIG. 7 may be stored in the storage device provided in the printer 30 until the printer 30 performs the program. Therefore, the acquisition method and the acquisition route of the program and the respective devices that store the program may be changed as appropriate. Therefore, the program executed by the processor provided in the printer 30 may be received from another device, via a cable or via wireless communication, and stored in a storage device, such as a flash memory. Examples of the other device include a PC and a server that is connected via a network.

(F) The respective steps of the main processing in FIG. 4, the data reception processing in FIG. 5, the print processing in FIG. 6 and the print data output processing in FIG. 7 are not limited to the examples performed by the CPU 41, the CPU 71 and the CPU 91, and part or all of the steps may be performed by another electronic device (an application-specific integrated circuit (ASIC), for example). Further, the above-described respective steps may be distributed and processed by a plurality of electronic devices (a plurality of CPUs, or a combination of at least one CPU and at least one ASIC, for example). Additionally, the order of each of the steps in the processing of the above-described embodiment may be changed, or steps may be omitted or added as necessary. Further, a case in which an operating system (OS) or the like that is operating on the printer 30 performs part or all of actual processing based on an instruction from the CPU provided in the printer 30 and the functions of the above-described embodiment are realized by the processing, is also included in the scope of the present disclosure.

What is claimed is:

1. A printer comprising:
a plurality of discharge control devices that are configured to be connected to at least one of a plurality of discharge port groups having a plurality of discharge ports capable of discharging liquid, and to control discharge of the liquid by the connected discharge port group;
a first ID storage device that is configured to store a unique ID that is set in advance for each of the discharge control devices;
a control data output device that is configured to output print data to each of the discharge control devices, the print data being, data to discharge the liquid by the discharge port group connected to the discharge control device;
a connection device that includes
a first connection port capable of connecting to the control data output device,
the plurality of second connection ports that are capable of respectively connecting to the plurality of discharge control devices and that are capable of connecting to the first connection port such that data transmission is possible, and
a connection control device that is configured to detect that, based on a voltage value of a signal line of the second connection port, the discharge control device has been connected to the second connection port and to control data transmission between the first connection port and the plurality of second connection ports;
an assigning device that is configured to be notified of a detection of a connection of the discharge control device to the second connection port by the connection control device and to assign a communication ID to each of the plurality of discharge control devices that are connected to the plurality of second connection ports and
used in processing that transmits data via the connection device between the control data output device and the discharge control device depending on an order in which each of the discharge control devices is detected:
a processor; and
a memory configured to store computer-readable instructions, wherein the computer-readable instructions cause the processor to perform processes comprising:
outputting print data corresponding to the unique SID from the control data output device, b using a communication ID that corresponds to the unique ID, via a connection device controlled by a connection control device, to each of a plurality of discharge control devices; and
controlling discharge of the liquid by the discharge port groups to which the plurality of discharge control devices are respectively connected, in accordance with the print data which corresponds to the unique ED of the individual discharge control device and which has been output from the control data output device.

2. The printer according to claim 1 further comprising:
a second ID storage device that is configured to store a notified communication II) when the communication ID assigned by the assigning device is notified to the discharge control device; and
a matching device that is configured to match the communication ID stored in the second ID storage device with the unique ID stored in the first ID storage device, wherein
the controlling by the discharge control device of the discharge of the liquid by the connected discharge port group is performed in accordance with the print data that has been output by the control data output device based on the communication ID, which is stored in a second ID storage device, and received by the discharge control device.

3. The printer according to claim 1, wherein
the assigning of the communication ID by the assigning device is performed. by the assigning device detecting the discharge control device when the discharge control device that has been connected to one of the plurality of second connection ports is activated, and assigning the communication ID in accordance with an order in which the discharge control device has been detected by the assigning device.

4. The printer according to claim 3, further comprising:
an electric power supply device that is configured to supply electric power to each of the plurality of discharge control devices, without passing through the connection device, wherein
the discharge control device is activated when a supply of electric power is started from the electric power supply device.

5. The printer according to claim 3, wherein
when the activating of the discharge control device is performed, a voltage or an electric current necessary for activation differs depending on each of the plurality of discharge control devices.

6. The printer according to claim 1, further comprising:
a first unit that includes at least one of the discharge port groups that discharges a first type of liquid that is the liquid for pretreatment, and
a second unit that includes at least one of the discharge port groups that is different to the plurality of discharge port groups of the first unit, and that discharges a. second type of liquid that is the liquid for post-treatment which is performed after the pretreatment, wherein
the plurality of discharge control devices include as first discharge control device and a second discharge control device, the first discharge control device that connects to one of the plurality of second connection ports and that causes the plurality of discharge port groups of the first unit to discharge the first type of liquid based on the print data output from the control data output device and the second discharge control device that connects to one of the plurality of second connection ports and that causes the plurality of discharge port groups of the second unit to discharge the second type of liquid based on the print data output from the control data output device, and
the outputting of the print data corresponding to the unique ID includes;

outputting the print data, which is used to discharge a first type of liquid by the discharge port groups of the first unit, from the control data output device to the first discharge control device via the connection device, by using the communication ID corresponding to the unique ID of the first discharge control device, and
outputting the print data, which is used to discharge a second type of liquid by the discharge port groups of the second unit, from the control data output device to the second discharge control device via, the connection device, by using the communication ID corresponding to the unique ID of the second discharge control device.

7. A non-transitory computer-readable medium storing computer readable instructions that, when executed, cause a printer to perform processes comprising:
outputting print data corresponding to a unique ID from a control data output device, via a connection device controlled by a connection control device, to each of a plurality of discharge control devices h using a communication ID that corresponds to a unique ID, the control data output device outputting the print data to each of the discharge control devices, the plurality of discharge control devices being connected to at least one of a plurality of discharge port groups having a plurality of discharge ports capable of discharging liquid, and controlling discharge of the liquid by the connected discharge port group, the unique II) being an II) that is set in advance for each of the discharge control devices and that is stored in a first ID storage device, the print data being data to discharge the liquid by the discharge port group connected to the discharge control device, the communication ID being an ID that is assigned by an assigning device to each of the plurality of discharge control devices that are connected to a plurality of second connection ports and being used in processing that transmits data via the connection device between the control data output device and the discharge control device depending on an order in which each of the discharge control devices is detected, the connection device including a first connection port capable of connecting to the control data output device and the plurality of second connection ports that are capable of respectively connecting to the plurality of discharge control devices and that are capable of connecting to the first connection port such that data transmission is possible, the connection control device controlling data transmission between the first connection port and the plurality of second connection ports, detecting that based on a voltage value of to signal line of the second connection port, the discharge control device has been connected to the second connection port, and notifying the assigning device of a detection of a connection of the discharge control device to the second connectionport; and
controlling discharge of the liquid by the discharge port groups to which the plurality of discharge control devices are respectively connected, in accordance with the print data which corresponds to the unique ID of the individual discharge control device and which has been output from the control data output device.

* * * * *

UNITED STATES PATENT AND TRADEMARK OFFICE
CERTIFICATE OF CORRECTION

PATENT NO. : 9,010,906 B2
APPLICATION NO. : 14/033861
DATED : April 21, 2015
INVENTOR(S) : Shumei Mori et al.

It is certified that error appears in the above-identified patent and that said Letters Patent is hereby corrected as shown below:

In the Claims:

At column 22, claim number 1, line number 22, please delete the "," after "print data being".

At column 22, claim number 1, line number 55, please correct "SID" to --ID--.

At column 22, claim number 1, line number 56, please correct "b using" to --by using--.

At column 22, claim number 1, line number 65, please correct "ED" to --ID--.

At column 23, claim number 2, line number 3, please correct "II)" to --ID--.

At column 23, claim number 3, line number 19, please delete the "." after "performed".

At column 23, claim number 6, line number 45, please delete the "." after "discharges a".

At column 23, claim number 6, line number 48, please correct "include as" to --include a--.

At column 24, claim number 6, line number 11, please delete the "," after "via".

At column 24, claim number 7, line number 21, please correct "control devices h" to --control devices by--.

At column 24, claim number 7, line number 29, please correct "unique II) being an II)" to --unique ID being an ID--.

At column 24, claim number 7, line number 50, please correct "value of to" to --value of a--.

Signed and Sealed this
Thirteenth Day of October, 2015

Michelle K. Lee
*Director of the United States Patent and Trademark Office*